United States Patent [19]

Adney et al.

[11] Patent Number: 4,718,443
[45] Date of Patent: Jan. 12, 1988

[54] MASS FLOWMETER APPARATUS

[75] Inventors: Billy R. Adney, Orange, Tex.; Charles W. Alworth, Ponca City, Okla.; John B. Durkee, Ponca City, Okla.; Bryce T. Jeffries, Ponca City, Okla.

[73] Assignee: Conoco Inc., Ponca City, Okla.

[21] Appl. No.: 11,954

[22] Filed: Feb. 6, 1987

[51] Int. Cl.⁴ .............................................. G01F 11/28
[52] U.S. Cl. ..................................... 137/8; 137/486; 137/487.5; 73/223
[58] Field of Search ................ 137/8, 2, 486, 487.5; 73/861.46, 861.49, 195, 223, 219

[56] References Cited

U.S. PATENT DOCUMENTS

| | | | |
|---|---|---|---|
| 3,001,397 | 9/1961 | Leonard | 73/219 |
| 3,125,881 | 3/1964 | Peters | 73/223 |
| 3,400,577 | 9/1968 | List | 73/223 X |
| 3,835,700 | 9/1974 | Gamble | 73/223 |
| 4,353,482 | 10/1982 | Tomlinson | 73/223 UX |
| 4,397,189 | 8/1983 | Johnson | 73/223 X |
| 4,480,466 | 11/1984 | Gates | 73/195 |
| 4,513,830 | 4/1985 | Persbeck | 73/223 X |

Primary Examiner—Alan Cohan
Attorney, Agent, or Firm—Cortlan R. Schupbach

[57] ABSTRACT

This invention relates to a method and apparatus for a liquid mass flowmeter. The flowmeter apparatus gives correct flow regardless of changes in density, viscosity, or composition of the liquid and corrects flow in spite of errors common in currently used flowmeters, such as, calibration shifts, restricted orifices and/or bearing drag and blade wear of turbine meters.

14 Claims, 8 Drawing Figures

PROTOTYPE SYSTEM

PLANT INSTALLATION

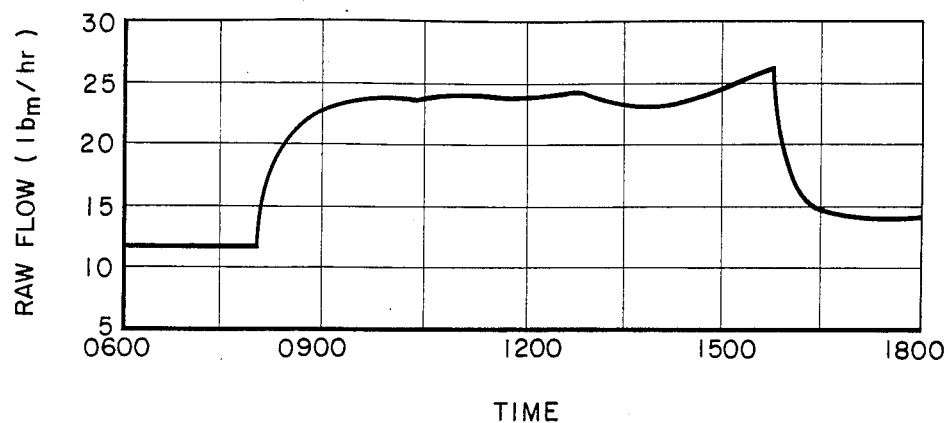
*F I G. 6A*
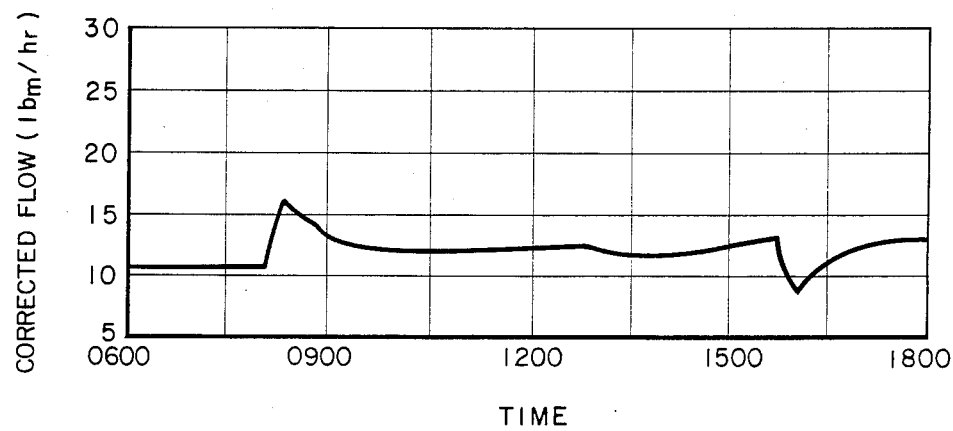
*F I G. 6B*

MASS FLOWMETER APPARATUS

This invention relates to measuring mass liquid flow rates. More specifically, this invention relates to measuring mass liquid flow rates utilizing an apparatus in open direct communication with the flow line being measured, wherein all liquid flow passing through the flow line can pass through the mass flowmeter apparatus.

BACKGROUND OF THE INVENTION

Accurate measurement of liquid flow in services such as oil field production, pipelines, injection of catalysts, catalyst inhibitors, co-catalysts, laminar flow, slurries (multi-phase liquid/solid suspensions), "pure" liquids, solutions, liquid/gas suspensions, pulsating systems and the like has long been a problem. Flowmeters in the past have largely depended upon knowing the density, viscosity, and composition of the liquids and assumes that steady state flow conditions are being measured. Various flowmeters have always been subject to errors such as calibration shifts, orifice restrictions, bearing drag and blade wear of turbine meters when inserted into liquid flow for measurement. The problem is particularly acute with respect to flow of high viscosity liquids or flow which contains contamination or quantities of solids or flows in the transition or laminar regions or flow streams which are in essence slurries. Liquids of this type are typically metered by an integral orifice meter at lower flow rates. Such meters are subject to partial plugging by the metered liquid and the solids contained therein, which partial plugging results in an "unknown flow" such that, one flow is reported while a second, unknown flow actually flows. This "unknown flow" is often discovered only by product deterioration or by lost product at varying times after the metered flow no longer accurately reports the actual flow. Often, such partial plugging spontaneously clears. However, as such clearing often occurs after steps are taken to correct or adjust the unknown flow, a period of end product variability results, resulting in large amounts of end product waste and a resultant unknown flow through the unplugged orifice.

In many processes, where possible, these problems are avoided by simply injecting an over supply of the required liquid. In other processes, an over supply results in a non-desired product and such a simple excess will not effectively overcome the lack of knowledge of liquid flow. In such situations, it has been common to use two or more meters in series, but is difficult to reconcile differing readings and to be sure which, if either, reading is correct. Other situations, such as intercompany or interplant transfer of liquids through pipelines, often results in inaccurate charges and oversupply or supply deficiencies in the fluid transferred.

The "unknown flow" costs industry considerable sums of money in off-specification product, liquid over-supply and under-supply, or other forms of waste. It would be highly desirable to provide an apparatus and method for determining mass flow accurately, reproducibly and preferably in a self-checking, self-correcting flowmeter which can adjust flow to a present target level, and correct its own output signal to give the true flow.

Representative but non-exhaustive examples of art attempts to measure and control flow is represented by U.S. Pat. No. 3,001,397 which utilizes a two-reservoir system having a valve between reservoirs which measures the change in reservoir level when the valve is closed for a pre-determined time. U.S. Pat. No. 4,353,482 is an example of conventional wet and dry blend feeding and metering systems. U.S. Pat. No. 4,397,189 describes a method for measuring low levels of liquid flow rates but does not provide continuous flow measurement, does not measure mass, and diverts fluid flow for measurement readings rather than processing all fluids.

Some flowmeters utilize a coriolis effect, where the liquid flow through a curved tube deflects the tube, where the degree of deflection over time is used to derive a mass flow reading. Such meters are subject to errors introduced by manufacturing, materials of construction, calibration, and product coating.

It would therefore be of great benefit to provide an apparatus and method for accurate measurement of flow as well as a means to correct the flow in the event of partial plugging of the meter, or a change in inherent meter performance, or a change in operating conditions.

It is therefore an object of the present invention to provide an apparatus and a method for measuring liquid mass flow. Other objects will become apparent to those skilled in the art as the description proceeds.

SUMMARY OF THE INVENTION

We have discovered that mass flow can be accurately measured by an apparatus comprising (1) a substantially vertical container having a known mass content per pressure read at different liquid levels, such that the difference in pressure between any two liquid levels equates to a difference in mass, and wherein the container is in direct open fluid communication with a conduit containing liquid; (2) means capable of providing a positive displacement pressure at the upper end of said vertical container; (3) means for filling said vertical container with liquid; and (4) means for monitoring the amount of liquid in the vertical container over a measured time interval and determining the rate of flow as the change in mass divided by the elapsed time as liquid exits the container. The apparatus can run intermittently, but preferably always provides flow of liquid from the reference container to the downstream process. The apparatus of the present invention uses two process cycles, fill and prove. During the fill cycle, the metered liquid enters the reference container by a fill valve which is controlled by a fill means such as a level transmitter or load cells. The signal is monitored and fills the container whenever the column head is below a specified level, such as 10 or 20 percent or when a prove cycle is finished. The container is then filled to an upper value, such as approximately 70 to 90 percent and the fill valve is closed. Time is allowed for container bounce to settle, before the prove cycle begins. During the prove cycle, a positive fluid pressure from a blanket liquid or a blanket gas is placed above the measured liquid in the vertical container, and the liquid exits into the flow line. Measurement as to height of container head or weight of container head are made and the mass of the liquid exiting the container is measured by comparing to a predetermined mass per unit of height or weight in the container. Measurement continues until the container head again falls below the specified level. This process is repeated as necessary in order to maintain liquid in the container and preferably provide a constant reservoir for the downstream process. The procedure described constantly updates the true mass flow rate.

The present invention as described is insensitive to the density of the liquid measured, while accurately providing a measurement of mass. If the density increases, the upper and lower set points will be lower in the container in an absolute sense, but will nonetheless measure the mass flow accurately. Conversely, liquid of less density will have set points higher in the container, but will reflect mass flow accurately. Even when several fill lines to the container are used, each with a liquid of different density, the mass flow of the exit line will be accurately measured.

Thus, during the proving cycle, the amount of liquid exiting the container to the flow line is measured and the mass flow rate through the line is determined as the mass exiting the container over the elapsed time during which liquid exited the container.

In addition, the apparatus of the present invention can check its own performance (or the performance of any flowmeter) by comparing the current meter readings against the integrated totalized meter readings of past cycles to obtain a correction factor and then control the flow of the liquid line by adjusting the flow utilizing the correction factor. Carrying out such a checking function, the apparatus comprises a self-checking mass flowmeter apparatus comprising (1) a substantially vertical container having a known mass content per unit of height or weight, said container in direct open fluid communication with a conduit containing liquid; (2) means capable of providing a positive displacement pressure at the upper end of said vertical container which means can be a blanket fluid or gas or simply an atmospheric vent; (3) means for filling said vertical container with liquid, and placing a constant positive displacement pressure on said container; (4) means for monitoring the mass of liquid in said vertical container over a measured time interval and determining rate of flow as change in mass divided by elapsed time as liquid exits the container; (5) means for determining the ratio $$\frac{\text{mass exiting container}}{\text{integrated output of previous flowmeter readings}}$$

to obtain a correction factor, and (6) means for adjusting the flow rate of liquid in said flow line to a target flow rate based upon the correction factor.

The apparatus of the present invention can check the performance of a flowmeter of any type, either itself or a flow meter external to the apparatus, by determining a correction factor in the manner described and controlling liquid flow through the flowmeter as required (target flow rate).

In a preferred embodiment, the instantaneous rate of change of pressure head is equal to the flow rate as described below. Thus, the apparatus of the present invention can function as a stand-alone flowmeter (without a conventional flowmeter in the monitored flow line.) In a single container apparatus, the last measured flow rate is "held" by the processor during the time the calibrated container fills and "bounce" settles. As soon as the instantaneous change of pressure head measurement is available, the processor uses the updated value as flow (if necessary producing a new correction factor) and the new value is "held" by the processor during the fill cycle, and so forth.

In practicing this invention, the substantially vertical container can be of any shape or size desired. The container is then calibrated for mass content per unit of height (such as by change in pressure head) or weight using a known reference liquid such as water. Once the container has been calibrated, similar changes in height or weight will determine the amount of mass exiting the container, which when divided by elapsed time, gives the current flow reading. An example of the calibration for directly measuring flow is to measure the change in the differential pressure between the highest and lowest set points of the container. The difference between the two readings is equal to the change in force divided by the area. Since force is equal to mass times the gravity constant, the difference in differential pressure is the net difference in the mass flowing into or out of the column. Alternately, the calibration can be made by measuring the pressure at the bottom of the container where the pressure measured is equal to the force times the area of the container. The force is equal to the mass times the gravity constant, therefore the change in mass times the gravity constant times the area equals the difference in pressure. Using this relationship, a change in container head directly relates to a change in mass. Stated in equation form:

$$\text{Pressure} = \frac{\text{Force}}{\text{Area}} = \frac{\text{gravity constant} \times \text{Mass}}{\text{Area}}$$

$$= \frac{\text{gravity constant}}{\text{Area}} \times \text{Mass}$$

so $$\Delta\text{Pressure} = \frac{\text{gravity constant}}{\text{Area}} \times \Delta\text{Mass}$$

where mass is a function of the liquid and gas mass, the gas being that which replaced the liquid. Expressed in equation form, $$\Delta\text{Mass} = \Delta\text{Mass of liquid} - \Delta\text{Mass of blanket fluid}$$

(gas or liquid)

Thus, a simple head measurement can provide an accurate reading of mass remaining in the container at any given time if the blanket fluid pressure remains constant. This measurement is independent of the density or viscosity of the liquid in the container.

It will be apparent to those skilled in this art that other methods for determining the mass of liquid in the container exist. For example, the container can be suspended from or positioned on strain cells and calibration can be carried out based on weight. Whatever the method used, the present invention accurately measures mass liquid flow.

The substantially vertical container of the present invention can be of any geometric configuration, can be of any size, and can vary in size from top to bottom. The present invention operates from a calibration of such container with a liquid of known mass by stepwise draining liquid from the container and measuring the mass of the amount drained, and contained mass at various levels is determined. Practicality dictates that the container preferably be of substantially uniform cross-sectional area for ease of calibration, ease of calculations while in use, and ease of cleaning if necessary. Of the possible containers, cylinders (or columns) are most preferred. For a container of substantially amorphous shape, or a container whose liquid surface area does not remain relatively constant, it is necessary to make numerous calibrations at close intervals in order to obtain accurate flow readings, leading to more difficult calculations, and potential loss of accuracy and repeatability.

Since the apparatus of the present invention only determines flow rate accurately during the prove cycle (or emptying cycle), use of the apparatus of the present invention to measure flow continuously requires multiple units, each of which can be utilized to generate a correction factor for the flow line as a whole. Use of multiple apparatus will provide a continuous flow measurement as well as a continuously updated correction factor.

The present invention can be self-checking and self-correcting by determining the flow measured, comparing to a target flow, and generating a correction factor. The correction factor is obtained by dividing the mass exiting the container by the integrated output of previous meter readings. The meter readings can be obtained from the apparatus itself, other similar apparatus, or any flowmeter of conventional type. Even though such conventional flowmeters are subject to plugging, for example, because of liquid passage through a restricted orifice, the apparatus of the present invention detects errors in such readings and directs a controller to provide sufficient flow to correct for such plugging problems. In the event of spontaneous clearing of the plug, the apparatus of the present invention senses the excess flow and reduces flow to meet the previously set target.

Since the present invention measures mass, the apparatus will give correct flow regardless of changes in density, viscosity, or composition of the liquid flowing through the line. Instrument errors common with currently used instruments, such as calibration shifts, partially plugged or restricted orifices, or bearing drag and blade wear in turbine meters are overcome by constantly measuring the actual flow and correcting the actual flow based upon the correct or target flow. The differential pressure method of measuring mass per unit height inherently compensates for fluctuations in specific gravity.

PREFERRED EMBODIMENT

Although not limited to such, the present invention will be described in terms of the structure and operation of the presently preferred embodiment. The preferred embodiment is more completely understood with reference to the drawings.

BRIEF DESCRIPTION OF THE DRAWINGS

FIG. 6(a) is a comparison with FIG. 6(b), illustrating the ability of the mass flowmeter to correct large misadjustments of standard flowmeters.

Figure 1:
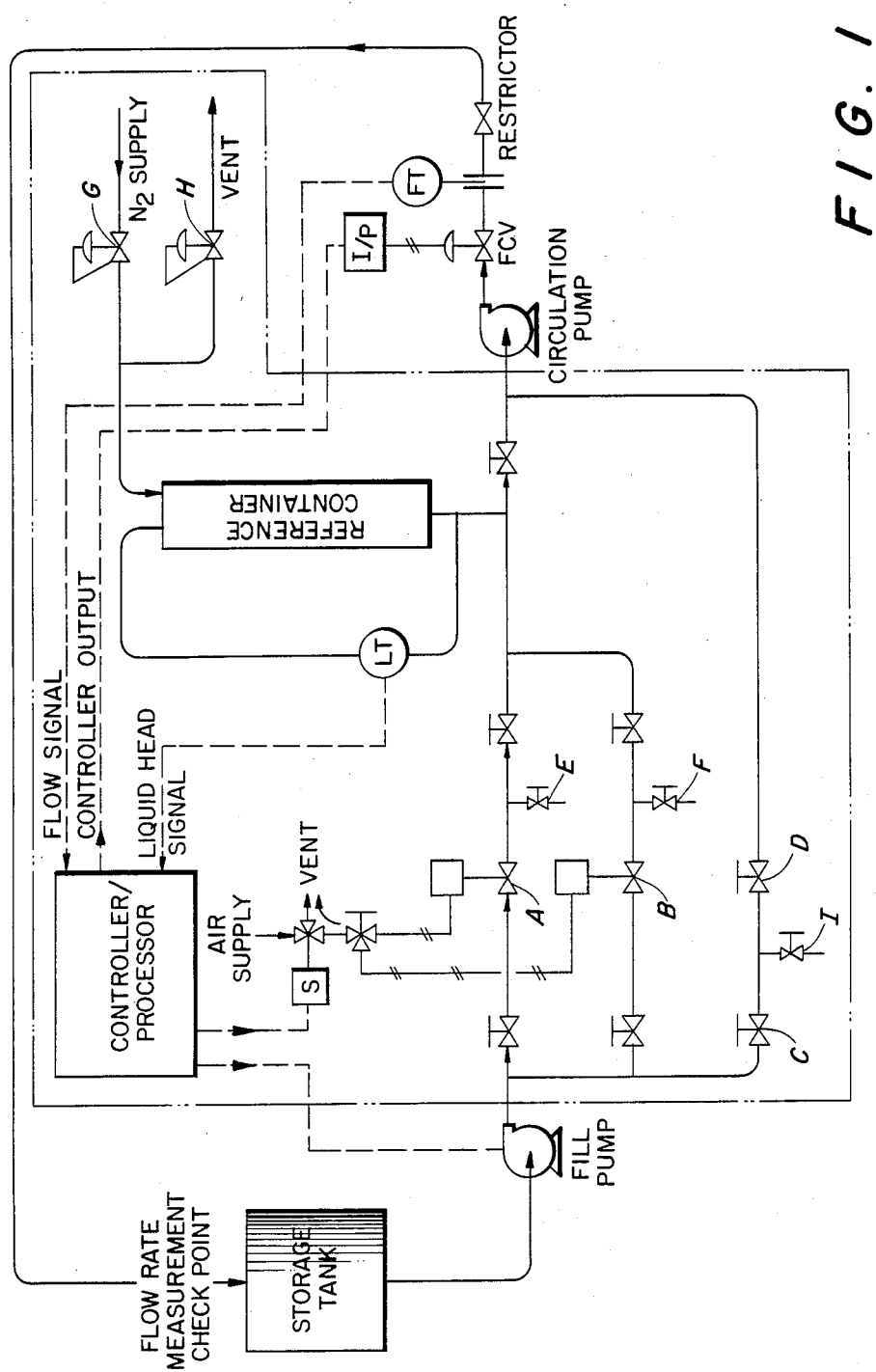
FIG. 1 is a prototype metering installation utilizing the present invention to monitor and correct the results produced by a commercial integral orifice flowmeter. A column is used as the container.

The instant invention is more concretely described with reference to the examples below wherein all parts and percentages are by weight unless otherwise specified. The drawings will be more concretely described with reference to the examples as the description proceeds. The examples are provided to illustrate the present invention and not to limit it.

While any substantially vertical container can be utilized in making the apparatus and carrying out the methods of the present invention, it is preferred that the apparatus use a container of substantially uniform cross-sectional area. Normally columns will be used as set forth in the preferred embodiment since these are more easily obtained and handled than other geometric configurations. For example, when column walls become fouled or encrusted the mass readings do not accurately reflect flow, and it is much easier to "pig" or otherwise clean containers in the shape of a cylinder. The use of cylindrical columns, however, are a matter of convenience and are simply preferred rather than critical to the present invention.

Flowmeter Calibration

Any given container used in the mass flowmeter must be calibrated and values given to the controller means.

The equation governing the application of the mass flowmeter is $$DP = C(M(l) - M(g)),$$

where

DP is the difference between the starting and ending differential pressures,

M(l) is the mass of the liquid that was removed over the mentioned differential pressure change, M(g) is the mass of the substantially immersible liquid or gas (illustrated as gas) which replaced the liquid removed, and C is the calibration constant of the mass flowmeter system, comprising the column, differential pressure cell and controller.

The mass flowmeter is calibrated by determining the value of C. This value will be the same regardless of the liquids measured by the mass flowmeter.

The equation can be developed into the form, $$C = \frac{DP}{M(l) * E}, \text{ where}$$

$$E = 1 - \frac{D(g)}{D(l)},$$

D(g) is the density of the mass flowmeter blanket fluid (liquid or gas), and

D(l) is the density of the liquid in the mass flowmeter. The calibration is most accurate if the ratio of the two densities is as small as possible. Otherwise, errors introduced in determining the gas density can result in unacceptable calibration errors. The calibration obtained is preferably carried out at or near atmospheric pressure using gas resulting in negligible errors being introduced.

With the mass flowmeter connected to a source of calibration fluid, the column will fill if the liquid is forced in and if the liquid exit port is closed.

Care should be exercised to ensure that all of the tubing and the drain apparatus is full of liquid to ensure that erroneous changes do not occur in the volume during calibration.

The level as indicated by the controller means should be approximately 70%. This value is recorded as the beginning level. The pressure, temperature, and molecular weight of the blanket gas are also recorded.

The mass of the liquid is removed from the column, either in steps or all at one time, and the mass is measured until the level indication is approximately 20%. The beginning level, any intermediate levels, final level and mass measurements for each are recorded.

The value for DP/M(l) is obtained by dividing the total percent range change obtained from the controller by the total mass of the liquid drained from the column.

Next density of the gas is calculated from the equation, $$D(g) = (PMw/ZRT),$$

where

P is the absolute pressure in pounds per square inch actual (psia),
Mw is the gas molecular weight,
Z is the gas compressibility,
R is the gas constant, 10.73, and
T is the temperature in degrees Rankine, providing the density in lb/cf.

E and then C can then be calculated.

While the apparatus of the present invention does not require knowledge of the absolute liquid level in the container, it is desirable in practice that the container not underfill or overflow. Therefore, percent levels are calculated in order that approximately the same portion of the container is used for both calibration and actual flow measurement. The set height prevents the container from overflowing during the fill cycle when used to measure liquids with a much different density than the density of the calibration liquid. The expected variation in liquid density is determined and the container and software are designed to prevent container overflow and underfill during the fill cycle.

EXAMPLE 6

Calibration of the mass flowmeter container using water when using differential pressure to measure mass is carried out as follows:

| | |
|---|---|
| The starting level reading | 71.27% |
| The ending level reading | 19.53% |
| The difference in readings | 51.74% |
| The mass of water withdrawn in various steps | 502.7 g |
| | 416.3 g |
| | 462.9 g |
| | 410.0 g |
| | 481.0 g |
| The total mass withdrawn | 2272.9 g |
| or | 5.0109 lb(m). |
| The ratio DP/M(l) | 10.325%/lb(m). |

The gas density, D(g), $$D(g) = \frac{(14.7\ psia)\ (28.96)}{(1.0)\ (10.73)\ (532\ deg\ R)}$$
$$= 0.0746\ lb(m)/cf.$$

—continued

| | |
|---|---|
| The density of water at 72° F. | 62.32 lb(m)/cf. |
| The value of E | 0.9988 |
| The value of the calibration constant, C | |

$$C = \frac{10.325\%/lb(m)}{0.9988}$$
$$= 10.34\%/lb(m).$$

Six parameters for use by the controller means must also be determined. They are, the integral time, which is a scaling factor used in the integration of the flowmeter input;

the setpoint deviation alarm SDA, which is the percent change in the level transmitter's input that triggers the end of a calibration cycle, the maximum flow rate, the absolute alarm 1 setpoint AAS, which causes the column to quit filling by closing the fill valve, and the comparator trip points CT1 and CT2, which stop fluid flowing to the calibration tank and activates an alarm relay if the tank overfills.

The differential pressure transmitter is spanned to approximately the same height in inches as the distance from the bottom of the transmitter to the top of the reference column. This span is called the reference column height and should never have to be changed.

Approximately half of the volume of the column is used to calculate the mass of liquid to be used as a reference mass while the mass flowmeter is in service. For example, if the column is 80 inches high and its internal diameter is two inches, the volume of half of the column would be 125.7 cubic inches or 0.07272 cubic feet. The mass of liquid occupying this volume would then be used as the reference mass.

The integral Time is calculated using this reference mass and the maximum flow rate, SPH, as follows.

$$\text{Integral Time} = 2 \frac{\text{Reference Mass}}{\text{Maximum Flowrate}}$$

The reference mass is most easily adjusted by making the fourth significant figure in the integral time equal to zero. The factor of two is present because of scaling factors being used in the controller used (Moore Mycro TM Controller), and may vary depending on the type of controller used.

The setpoint deviation alarm is the percent change seen while the reference mass is flowing out of the column. This is calculated using the calibration constant of the mass flowmeter, the value of E, and the reference mass, as follows:

$$SDA = C*E*(\text{reference Mass}),$$

where

C has unit of %/lb(m),

E is calculated using flowing conditions, and the reference mass has units of lb(m).

Thus, integral time, setpoint deviation alarm, and maximum flowrate have been calculated.

Since the differential pressure transmitter is spanned to approximately the same height as the reference column using water as a reference, the use of a liquid with a different specific gravity necessitates calculating the percent levels for that liquid. The percents used if water were used as calibrating fluid are, the absolute alarm 1 setpoint: 65.0%, the comparator trip point CT1: 90.0%, and
the comparator trip point CT2: 85.0%.

Multiplying each of these percentage values by the gravity of the fluid to be measured will give the correct values to enter into the controller.

Container Calibration Example

Assume the following conditions.

The fluid has a density of 57.0 lb(m)/cf and a gravity of 0.915. A maximum flow rate of 50 lb(m)/hr will be measured.

The blanket gas is nitrogen at a pressure of 44.7 psia and a temperature of 70° F.

The reference column is 80 inches long and is two inches in diameter.

The volume of 40 inches of the column is 0.07272 cf. The reference mass is then calculated to be 4.145 lb(m). Using a more convenient reference mass of 4.000 lb(m), the integral time is next calculated as, $$\text{Integral Time} = 2 \frac{4.000 \text{ lb(m)}}{50.00 \text{ lb(m)/hr}} * 60 \text{ min/hr}$$

$$= 9.60 \text{ minutes.}$$

The density of the blanket gas is calculated as 0.2201 lb(m)/cf. This gives a value for E of 0.9961. The setpoint deviation alarm value is then calculated as, $$SDA = 10.34 * 0.9961 * 4.000\%$$

$$= 41.20\%.$$

$AAS$, $CT1$, and $CT2$ are calculated as, $$AAS = 65.0 * 0.915\% = 59.5\%,$$

$$CT1 = 90.0 * 0.915\% = 82.4\%, \text{ and}$$

$$CT2 = 85.0 * 0.915\% = 77.8\%.$$

Thus the parameter values used in the controller means are,
Integral Time: 9.60 minutes,
SDA: 41.2%,
Max Flowrate: 50.00 lb(m)/hr,
AAS: 59.5%,
CT1: 82.4%, and
CT2: 77.8%.

Any controller device capable of doing the calculations described can be used. Representative but non-exhaustive examples of suitable flow controllers are standard Moore Mycro ™ Architecture 352-B for DDC controller (FCO 41) available from Moore Products Inc. and the Foxboro Spec 200 Micro ™ Controller, available from Foxboro Corp., Foxboro, Mass.

OPERATION EXAMPLES

A prototype flowmeter system was constructed as described in FIG. 1. The system contains two fill valves, A and B; two bypass valves in series, C and D; and several block valves. Needle valves are present to provide a block and bleed arrangement in order to assure that the bypass line is closed. In normal operation, fluid flows through the column only through either A or B with the alternate route blocked. Occasionally, the bleed valve E or F is opened to determine whether any liquid flows from the line. If no liquid flows, the associated fill valve is closed. If liquid drips, then the associated fill valve could be leaking. If the fill valve leaks, liquid coming from the reference container will include the leak from the fill valve which means that the liquid reference mass is in error and an erroneous result will be given. In the case of leakage the alternate flow valve B is opened and the route through valve A is closed and repaired.

Similarly the bleed valve associated with the double block bypass valves can be opened. If leakage occurs either C or D could be leaking and the reference column signal will be distorted. To ensure that the bypass valves C and D are not leaking, bleed valve I can be opened, thus checking for leaks.

In the prototype apparatus built, Whitney Series 60 ™ Swingout Ball Valves were used for the block and fill valves because of their ease of field repair, although any suitable positive shut-off valves can be used. The level transmitter designated LT in the drawing is a Honeywell ST 3000 ™ Electrical Differential Pressure Transmitter. The controller designated in the diagram is a Moore Mycro 352 ™, Revision B, which was programmed to fill the column when necessary, measure a set head change while integrating the flow signal, calculate a correction factor and output the factor and calculate the correct flow, receive a remote pulse set point, provide a flow control output, and refill the column for the next cycle. Positive pressure for displacement was provided by nitrogen gas which is placed in the column headspace to provide a displacement pressure of about five pounds above line pressure. The pressure is provided through valve G, and pressure is relieved during filling through valve H. Fluids were recirculated to the storage tank.

The solenoid(s) and air supply allows pressure to be applied to one side of the valve and allows the opposite side to be vented. The A and B ball valves are operated by the valves. The flow control valve (FCV) is controlled by the pressure/current transducer (I/P). A restrictor was placed in the line to provide backpressure in the small flow line to allow the flow control valve to operate properly. Normally, a restrictor is not necessary if a flow control valve of proper size for the flow line is used.

The present invention was used to check the accuracy of a commercial-type flowmeter which measures flow through an orifice. An in-line integral orifice was used as the test flowmeter. An oversize orifice opening was simply drilled in an existing orifice, resulting in rough edges which were not machined or beveled. The resulting rough-edged orifice provided a choke point in the flow line as well as a high probability of plugging and more erroneous readings than most commercial orifice flowmeters.

Referring to FIG. 1, the fill pump runs intermittently whenever the container (column) empties below a minimum set point and the controller calls for the column to fill. The control valve is capable of controlling the flow based upon the back pressure of the system and the flow setpoint entered into the controller. The system normally operated from 5 to 35 pounds per hour, with flow drive force being supplied by the constantly moving circulation pump Mass flow measurements were made where the liquid flowed into the storage tank, using an 800 milliliter beaker and a stopwatch.

Figure 2:
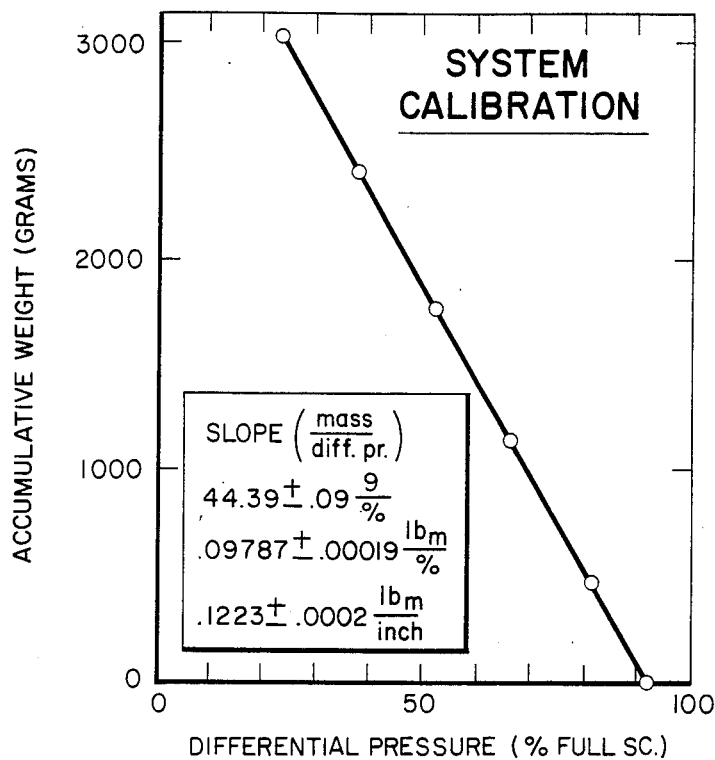
FIG. 2 illustrates a system calibration made utilizing water to determine the mass of the container, determined as per percent change in span of the level transmitter used in the mass flowmeter system.

The reference column was tested for a linear relationship between height and mass. The reference column was a 6 foot long, 2 inch I.D. cylinder that had been tetrafluoroethylene coated to ensure separation of the liquid from the wall. The calibration compensated for any uncertainty about the evenness of the coating. Flow lines were ¼" I.D. The calibrations were carried out over 58% of the cylinders span (cylinder span=80 inches) as described in FIG. 2, where the accumulated weight in grams was compared against the differential pressure as a percent of full scale. The slope relates pounds mass per inch or percent of height and the accuracy was determined by $$\frac{\text{(Sum of weight increments)}}{\text{(initial \%)} - \text{(final \%)}} = \frac{\Sigma W}{\text{initial \%} - \text{final \%}}$$

The level transmitter was used as the reference for head on the column. The column was drawn down in approximately 14 percent increments and the liquid volume weighed. As can be seen from FIG. 2, the results showed that the column accuracy was much better than the 1 percent expected if pipe diameter measurements were used. Once the calibration had been made, the mass was referenced to differential pressure in the column head. Differential pressure was used instead of weight because it allowed high accuracy at decreased cycle times when compared to weight measurements.

The controller calculates the actual flow in mass, checks the reading of the standard orifice flowmeter and calculates the correction factor (K) as reference mass (calibration column) over integrated mass (orifice flowmeter) and adjusts the flow based on the resulting K factor. The comparison is made at the end of each calibration column prove cycle and a new K factor is computed.

The system was tested using circulating water in two cases and a mixture of corn syrup and water to change liquid viscosity and density in another case.

EXAMPLE 1

The flow rate was set at 35 pounds per hour. A beaker and stopwatch were used to measure mass flow per unit time. The water used was contaminated with dirt and caused the integral orifice to plug and unplug. The plugging caused the K factor to change noticeably from cycle to cycle.

The set point was changed to 30 pounds per hour and the measured flow rate started at a very low level (approximately 23 pounds per hour) and was corrected up into the fifth cycle. The value of the K factor changed dramatically, showing that the orifice was plugging and the system was attempting to correct the flow. A large change in K occurred at the sixth cycle when the plug in the orifice spontaneously cleared. The test was terminated and solids suspended in the water were allowed to settle before the experiment was continued.

Upon continuing the flow measurement test, the system corrected the flow as if no blockage was present. In this case only one flow point was measured. The flow was then increased to 35 pounds per hour and the blockage problem reoccurred as suspended solids again became a factor. However, linearity remained good as the system responded to the blockages by adjusting the K factor. The preset flow rate was the benchmark by which all K factors were generated, resulting in flow close to target even though intermittent orifice meter plugging and clearing occurred.

EXAMPLE 2

The experiment was continued after adding corn syrup to the water to obtain a 20 percent corn syrup in water solution. The dirty water previously used in the experiment was left in the system. The gravity of the fluid was found to be 1.05.

Figure 3:
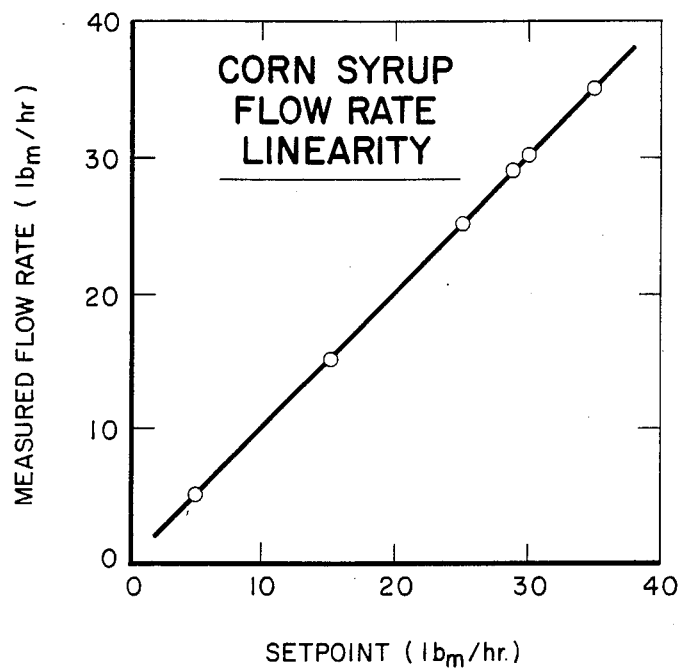
FIG. 3 shows the flow rate linearity of water flow measured using the apparatus of the present invention.

The flow rate was varied over the 5 to 35 pounds per hour range, as was used in Example 1. The system corrected the flow to the desired rate. The linearity of the meter over an 8 to 1 turndown is set forth in FIG. 3. The data plotted is the average of the last two values read at each setting. Several flow rates were measured and recorded at each set point after the flow had settled before the value was plotted. The graph line represents the theoretical slope which would be true if the measured flow rate were equal to the setpoint flow rate. The data obtained was an excellent fit to the theoretical slope, as shown by the data points as entered on the slope.

EXAMPLE 3

Figure 4:
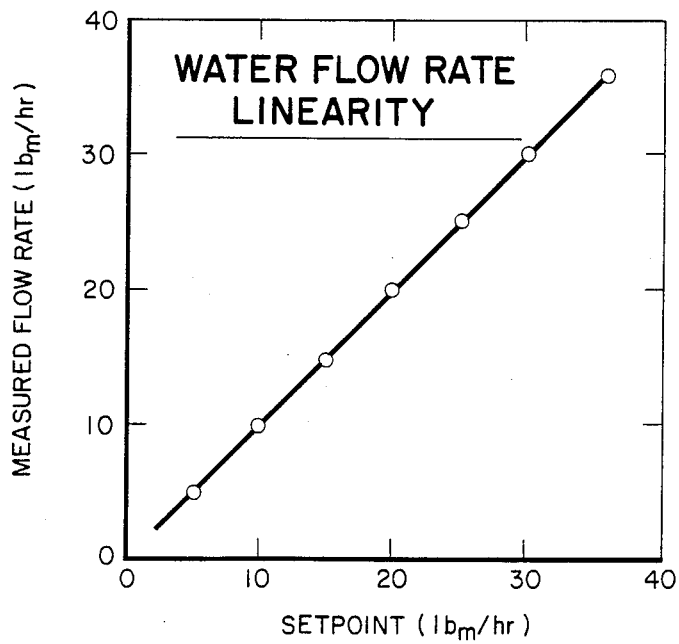
FIG. 4 shows the linearity of flow rate using the present invention when viscosity and gravity changes were made by adding a thickening agent.

The entire system was cleaned, all dirty water and corn syrup solution was removed and the system was filled with clean water. Over the 5 to 35 pound per hour ranges, the set point linearity was excellent. Removal of the dirty water removed the problems encountered in plugging the orifice in the initial experiments. The linearity of the corrected flow was again a 45 degree sloped line, as shown in FIG. 4.

In conducting the tests, the controller was used to set the flow rate. Constant correction toward meeting the flow rate, whether the orifice was plugged or unplugged, showed that the system maintained constant attention toward correction.

EXAMPLE 4

Figure 5:
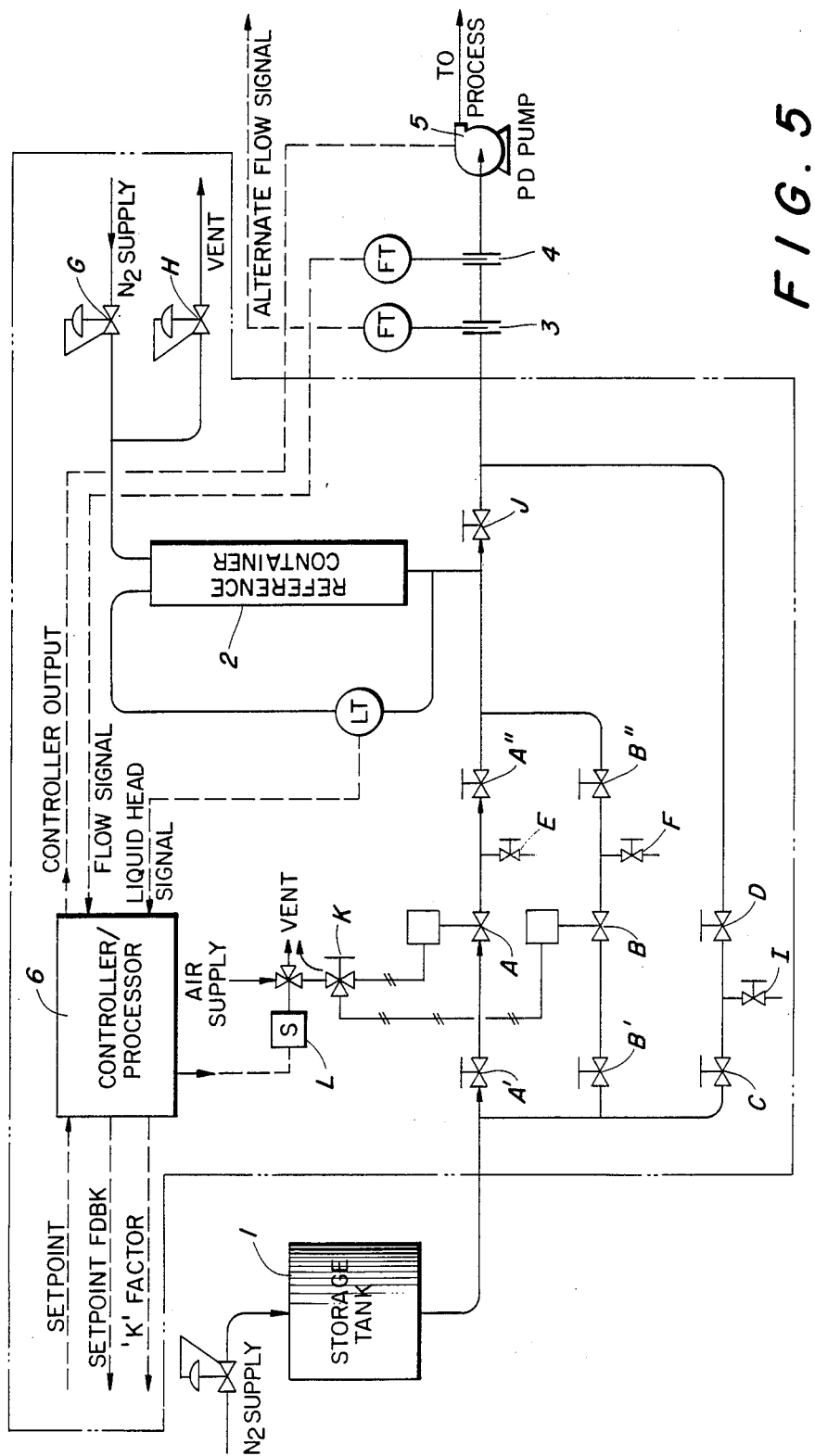
FIG. 5 is a schematic of a plant installation of an apparatus of the present invention.

1. A plant trial was carried out measuring the flow of acetyl acetone. A schematic diagram of the installation is shown in FIG. 5, where all symbols and values are as described in FIG. 1. The flow line meter in the plant (in reality two commercial integral orifice meters connected in series, and designated FT in the figure) was checked by the mass flowmeter of the present invention. The use of the mass flowmeter was tested over a variety of test conditions. The acetyl acetone flow was designed to vary from 5 to 50 pounds per hour.

Over one month of integrations, measured consumption based on tank level measurements was compared to mass-flowmeter measured consumption. In addition, the processor or controller provided a setpoint feedback and a correction factor to the plant process. It should be noted that no restrictor or choke point was necessary since the system was appropriately sized for the process line on which it is installed.

Referring to FIG. 5, liquid enters the process from storage tank (1), through the prototype flowmeter fill and block valves [(A', A, and A") or alternative valves (B', B, and B")]; diverts as necessary to the Reference Container (2); through the output block valve (J); through two existing integral flowmeters (3, and 4); and finally through a stroke controlled positive displacement pump (5). The two integral flowmeters were used to cross-check one another prior to the prototype meter installation.

An alternative flow path is found when block valves A' and B' are closed with double block valves C and D open and with output block valve J closed. In this case, the fluid flows around the flowmeter from storage tank (1); through existing integral orifice flowmeters (3 and 4); and finally through the stroke controlled positive displacement pump (5). This path is used whenever it becomes necessary to take the prototype meter system out of service.

Flow transmitter (3) provides an alternate flow signal to the control room. Flow transmitter (4) provides the "raw flow" signal to the processor, where the signal is integrated and compared to the Reference Container (2) signal as previously explained. The Processor (6) controls the fill cycle via fill valves A or B, as previously explained.

The processor section of the processor/controller (6) passes the corrected flow signal to the Flow Controller section of the processor/controller, where correct flow is compared to setpoint, generating the controller output in a standard manner used by the industry. The controller output signal is fed to the stroke control of the positive displacement pump (5) where the inhibitor flow will be adjusted to meet the setpoint requirements of the controller/processor (6).

The Flow Controller section of the controller/processor (6) receives its setpoint from two sources; the operator whenever the controller is in "local mode" or a plant computer whenever the controller is in "computer mode". Additionally, the controller section informs the plant computer of the controller's current setpoint and the processor section informs the computer of the processor's present "K" factor. The plant computer, which monitors the "raw flow" signal from the Flow Transmitter (4) uses the current "K" factor and the "raw flow" to produce the same flow signal that the processor calculates. This correct flow is then recorded and used for further process control (outside the scope of this description).

Assume the system is operating on fill valve A. The operator should occasionally close block valve A", see that the fill valve is closed, then open bleed valve E. When the bleed valve is opened, some liquid will escape due to the "holding tank effect"; this effect will disappear rapidly because liquid should not continue to flow into the "tank". If no liquid continues to escape, fill valve A is holding and the reference container is producing valid data. If liquid continues to escape, then either valve A" is leaking or fill valve A is not holding, thus producing invalid data. If no liquid escapes, the operator closes valve E and continues operation. However, if liquid escapes from valve E, then the alternate fill valve must be placed in service.

To place the alternate fill valve in service, the air control signal from the solenoid valve L is switched to the alternate fill valve via air control valve K. Block valves B' and B" should be opened while block valves A' and A" should be closed. This change to alternate fill valves can be made in a matter of seconds. It is apparent that the alternate fill valve can be placed in service even if the fill valve which is being taken out of service is at that instant open.

A determination of which of valves A', A or A" is leaking can now be made and the necessary repairs undertaken. It is not necessary to put valve A back in service once the repair has been made; rather valve A now serves as the alternate fill valve.

2. As a part of the plant trial, the conventional commercial flowmeter was intentionally mis-adjusted for a 100% calibration error at 8:00 A.M. on a given day during the trial. The error was removed at 4:00 P.M. the same given day. FIG. 6(a) shows the flow plot based on the conventional meter readings. FIG. 6(b) shows the indicated flow based on the mass flowmeter, whose calibration remained unchanged. The mass flowmeter recognized and corrected the erroneous flow, preventing an erroneous amount of off-quality plant product for the day, resulting in a savings of approximately $46,000.

EXAMPLE 5

A large scale 35-day accuracy check of an inplant mass flowmeter performance was made. The experimental flowmeter described in Example 4 was used to measure flow from a cylindrical storage tank approximately 20 feet tall and 10 feet in diameter over a period of 35 days. The tank was placed under about 45 pounds per square inch (psi) $N_2$. The change in level in the tank was measured using a pneumatic Foxboro Model 13A level transmitter. The tank contained a liquid of known density and had a known volume change at the end of 35 days.

The mass flowmeter was used to check flow (measured as mass as determined by $\Delta P$) hourly. The tank level dropped as liquid was used. The total number of pounds of liquid consumed (measured as tank level change) as compared to the mass flowmeter's integrated total showed only a 0.0076 percent difference.

Figure 7:
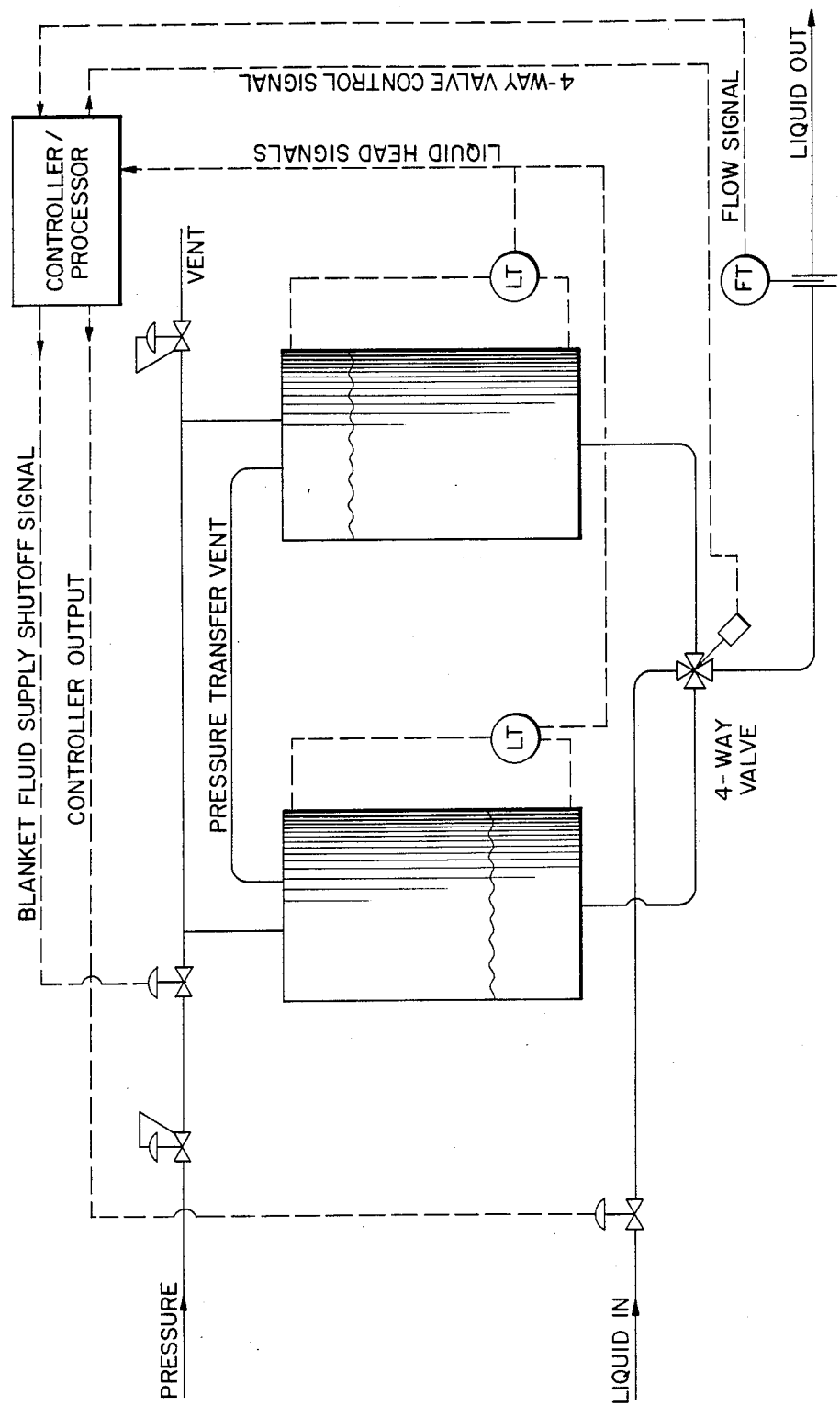
FIG. 7 illustrates a continuous measurement system utilizing two apparatus in asynchronous cycle to produce a substantially constant flow through alternating prove cycles.

FIG. 7 is a block diagram showing the asynchronous use of at least two mass flowmeters in a large volume mass flow. Each calibration tank is equipped with a level transmitter. All line flow passes through at least one calibration tank. As tank A is filled through a 4-way valve when instructed by the controller, the displaced gas is used as makeup to tank B, supplemented through line C to provide positive displacement pressure. In this method flow into one tank is controlled while the second tank is proving, maintaining constant flow through the system. The prove cycle from each of A and B provides a substantially constant flow reading and K factors to adjust flow as needed to meet the target flow. All flow passes through at least one of the calibration tanks. This method reduces the amount of makeup gas reached, as very little gas is vented. In FIG. 7, a conventional flowmeter (FT) is checked for mass flow accuracy.

When utilizing the apparatus of the present invention, it is apparent that more than one reference column can be used and that these may be of different sizes and shapes. It is only critical that each column be calibrated for a determination of mass per unit height or weight in order that subsequent mass determinations on liquids of any composition or viscosity can be carried out. All liquids require a brief "quiet" period before initiating the prove cycle in order to allow the calibration tank head to settle.

When utilizing the self-checking features of the present apparatus, whether current output is used to check previous outputs of the same mass flowmeter, that of a second apparatus, or a commercial flowmeter, the controller means for obtaining a correction factor will, after each prove cycle, (a) refill the vertical container for subsequent cycles (b) output the correction factor for the past cycle (c) calculate the correct flow by multiplying raw flow times the correction factor (d) output the correct flow (e) use the correct flow for its own measured flow and (f) adjust the flow to match measured flow and target flow.

The present invention is useful for mass flows ranging from very small to extremely large depending upon the size of the reference column and the cycle time chosen. The reference column is normally calibrated and measurements made over a predetermined distance, such as from 20 to 70 or 90 percent of the column height. In a preferred embodiment for measuring large amounts of flow, such as in pipelines transmitting large amounts of hydrocarbon, the reference containers for the flowmeter can include containers up to the size of tank farm storage tanks. It would be apparent that units or containers of this size will be subject to temperature variation but simple calculation shows that in reference to the fluid mass flow measured, the error due to temperature in most ambient temperature ranges is negligible and flow measurement accuracy remains far superior to the results obtained using currently available flowmeters.

The term "positive displacement pressure" as used in this specification and claims means pressure necessary to provide a constant pressure either at the calibration container vent or at the liquid outlet of the calibration container. Depending on the liquid being measured, atmospheric pressure may be all that is necessary, as in the case of a gravity-fed process using a liquid of low viscosity, or when the calibration container supplies a suction source. In the case where the calibration container supplies a source requiring a minimum pressure, such as a positive displacement pump, the calibration tank would require a positive displacement pressure above that required by the source, which can be either above or below atmospheric pressure. If a blanket fluid (either liquid or gas) is used which is more dense than the fluid being measured, the apparatus and method of the present invention is simply inverted.

Thus, the positive pressure necessary in the present invention is simply any pressure sufficient to displace fluid from the container, and includes atmospheric pressure. Extreme pressures, that is those above about 10,000 pounds, may tend to cause apparatus errors in that the gas compressibility becomes a factor and in that the density of the gas approaches either the measured liquid or the gas critical point and becomes indistinguishable from the measured liquid. In these conditions, accurate measurement of pressure and height of fluid in the column becomes more difficult and inaccurate. If a blanket liquid (immiscible with and of significantly different density than the liquid being measured) is used, even very high pressures are practical, the important factor being the difference in density.

While certain embodiments and details have been shown for the purpose of illustrating the present invention, it will be apparent to those skilled in this art that various changes and modifications may be made herein without departing from the spirit or scope of the invention.

We claim:

1. A mass flowmeter apparatus comprising
   (1) a substantially vertical container having a known mass content per unit of height or weight, said container in direct open fluid communication with a conduit containing liquid;
   (2) means capable of providing a positive displacement pressure at the upper end of said vertical container;
   (3) means for filling said vertical container with liquid, and placing a constant positive displacement pressure on said container;
   (4) means for monitoring the amount of liquid in said vertical container over a measured time interval and determining rate of flow as change in mass divided by elapsed time as fluid exits the container.

2. An apparatus described in claim 1 wherein the substantially vertical container is of substantially uniform cross-sectional area.

3. A self-checking mass flowmeter apparatus comprising
   (1) a substantially vertical container having a known mass content per unit of height or weight, said container in direct open fluid communication with a conduit containing liquid;
   (2) means capable of providing a positive displacement pressure at the upper end of said vertical container;
   (3) means for filling said vertical container with liquid, and placing a constant positive displacement pressure on said container;
   (4) means for monitoring the amount of liquid in said vertical container over a measured time interval and determining rate of flow as change in mass divided by elapsed time as liquid exits the container, and
   (5) means for determining the ratio $$\frac{\text{mass exiting container}}{\text{integrated output of previous flowmeter readings}}$$

to obtain a correction factor, and
   (6) means for adjusting the flow rate of liquid in said flow line to a target flow rate based upon the correction factor.

4. An apparatus as described in claim 1 wherein the substantially vertical container is of substantially uniform cross-sectional area.

5. An apparatus as described in claim 4 wherein the means for monitoring the amount of liquid in the vertical column is a pressure head measurement.

6. An apparatus as described in claim 5 wherein the means for obtaining the correction factor is a computer controller means.

7. An apparatus as described in claim 6 wherein the flowmeter apparatus is self-checking by means of a controller means obtaining the correction factor and thereafter
   (a) refilling the vertical container for a subsequent cycle;
   (b) outputting the correction factor for the past cycle;
   (c) calculating the correct flow by multiplying raw flow times the correction factor;
   (d) outputting the corrected flow;
   (e) using the corrected flow for its own measured flow.

8. A method for measuring liquid flow in conduits comprising connecting to said conduit a mass flowmeter comprising
   (1) a substantially vertical container having a known mass content per unit of height or weight, said container of substantially uniform cross-sectional area, said container in direct open fluid communication with the conduit containing flowing liquid,
   (2) filling said vertical container with liquid and placing a constant positive displacement pressure on said container,
   (3) monitoring the amount of liquid in said container over a measured time interval and determining the rate of flow as the change in mass divided by the elapsed time, and
   (4) determining the ratio $$\frac{\text{mass exiting container}}{\text{previous measured mass flow rate}}$$

to obtain a correction factor, and (5) adjusting the flow rate of the liquid in said flow line to a target flow rate based upon the correction factor.

9. A method as described in claim 8 wherein the amount of liquid in the vertical container is monitored by measuring the height of liquid in the vertical container as differential pressure.

10. A method as described in claim 9 wherein the height of said column is transmitted to a computer means which determines the correction factor, which correction factor is utilized to actuate a valve actuator means to control liquid flow.

11. A method as described in claim 10 wherein multiple flowmeter apparatus are utilized such that at least one apparatus is filling while at least one apparatus is discharging and flow is being measured, such that substantially continuous measurement of flow is obtained.

12. A method for measuring flow in pipelines comprising utilizing multiple flowmeter apparatus, each of which comprises
   (a) a substantially vertical container of known mass content per unit of height or weight, said container in direct open fluid communication with the flow line containing fluid, the method comprising
   (b) means for filling said vertical container with liquid, said liquid filling displacing a substantially immiscible fluid, either liquid or gas, from said container and utilizing displaced fluid by
   (c) placing said displaced fluid into at least one second container and adding sufficient additional fluid to create a positive displacement pressure in said second container,
   (d) displacing liquid from the second container with the conduit containing flowing fluid, while
   (e) monitoring the amount of fluid in said second vertical container over a measured time interval and determining the rate of flow as the change in mass divided by the elapsed time, and
   (f) determining the ratio $$\frac{\text{mass exiting second container}}{\text{previous measured mass flow rate}}$$

to obtain a correction factor, and
   (g) adjusting the flow rate of the fluid in said flow line to a target flow rate based upon the correction factor, then
   (h) filling said second vertical container with liquid and displacing substantially immiscible fluid, either liquid or gas, from above said liquid, and placing said displaced fluid into said first vertical container,
   (i) placing a positive displacement pressure at the upper end of said first vertical container and
   (j) monitoring the amount of liquid in said first vertical container over a measured time interval and determining the rate of flow as change in mass divided by lapsed time and determining the flow as $$\frac{\text{mass exiting first container}}{\text{previous measured mass flow rate}}$$

to obtain a correction factor, then
   (k) adjusting the flow rate of liquid in said flow line to a target flow rate based upon the correction factor while simultaneously filling at least one second vertical container, the displaced fluid from said vertical container being utilized to assist in placing a positive displacement pressure above the container being emptied, and
   (l) repeating step (b) through (k) to provide substantially constant monitoring of mass flow rate.

13. A method as described in claim 12 wherein the vertical containers are of substantially uniform cross-sectional area.

14. A method as described in claim 13 wherein the amount of liquid in the vertical container is monitored by measuring the height of liquid in the vertical containers using differential pressure.

* * * * *